United States Patent [19]

Scheim

[11] Patent Number: 5,741,839
[45] Date of Patent: Apr. 21, 1998

[54] STORAGE-STABLE ALKOXY-CROSSLINKING RTV1 SYSTEMS

[75] Inventor: Uwe Scheim, Coswig, Germany

[73] Assignee: Huels Silicone GmbH, Nuenchritz, Germany

[21] Appl. No.: 642,173

[22] Filed: May 2, 1996

[30] Foreign Application Priority Data

May 2, 1995 [DE] Germany .................. 195 15 947.0

[51] Int. Cl.$^6$ ............................................ C08K 5/54
[52] U.S. Cl. ................. 524/188; 524/237; 524/588; 524/863
[58] Field of Search .................. 524/188, 237, 524/588, 863

[56] References Cited

U.S. PATENT DOCUMENTS

| | | | |
|---|---|---|---|
| 4,472,551 | 9/1984 | White et al. | 524/863 |
| 4,477,625 | 10/1984 | Lockhart | 524/863 |
| 4,499,229 | 2/1985 | Lockhart | 524/863 |
| 4,681,913 | 7/1987 | Evans et al. | 524/862 |
| 4,895,918 | 1/1990 | Lucas | 528/18 |
| 5,213,899 | 5/1993 | Lucas | 524/863 |
| 5,268,441 | 12/1993 | Barthel et al. | 524/863 |

FOREIGN PATENT DOCUMENTS

| | | | |
|---|---|---|---|
| 0 149 903 | 7/1985 | European Pat. Off. . | |
| 221644 | 5/1987 | European Pat. Off. | 524/863 |
| 0 228 505 | 7/1987 | European Pat. Off. . | |
| 0 264 336 | 4/1988 | European Pat. Off. . | |
| 0 500 010 | 8/1992 | European Pat. Off. . | |
| 1 349 641 | 12/1963 | France . | |

Primary Examiner—Karen A. Dean
Attorney, Agent, or Firm—Oblon, Spivak, McClelland, Maier & Neustadt, P.C.

[57] ABSTRACT

Storage-stable, alkoxy-crosslinking RTV1 systems that contain carbodiimides as stabilizers.

14 Claims, No Drawings

STORAGE-STABLE ALKOXY-CROSSLINKING RTV1 SYSTEMS

BACKGROUND OF THE INVENTION

1. Field of the Invention

The invention concerns storage-stable, alkoxy-crosslinking RTV1 systems, which contain carbodiimides as stabilizers.

2. Description of the Background

Single-component silicone rubber mixtures (RTV1), which can be stored with the exclusion of water and are vulcanized to form elastomers with access to water at room temperature, are known. They generally contain a polymeric, mostly linear siloxane, a crosslinking compound, which must contain easily hydrolyzable groups, a plasticizer, which is generally a methyl-terminated polydimethylsiloxane, and perhaps other additives, such as curing accelerators, pigments, processing auxiliaries, and fillers. The mixtures can be vulcanized releasing an acid—for example, in the presence of acetoxysilanes; releasing a base—for example, by means of aminosilanes; or neutrally—for example, with compounds that contain oxime or alkoxy groups. Neutrally crosslinking RTV1 systems are needed, above all, if it is necessary for the cleavage products formed during the curing of the mixtures to not influence the substrate, for example, with the jointing of concrete or metal materials.

Alkoxy-terminated polyorganosiloxanes are a compound class of the polymeric siloxanes used in silicone rubber mixtures, which are used in particular for neutrally crosslinking systems.

In comparison to traditional systems, alkoxy-crosslinking RTV1 systems have many advantages. Thus, for example, carboxysilane-containing systems are not neutrally crosslinking and cost-intensive crosslinking agents are used in oxime or benzamidosilane-containing systems.

There are undesirable chemical reactions in the storage of RTV1 mixtures of all known crosslinking systems. Caused by traces of moisture, there will either be a premature crosslinking of the paste (that is, the mixture can no longer be pressed from a container or package) or, due to OH-containing cleavage products, equilibrium reactions are triggered (that is, the mixture is no longer cured at all).

Whereas, as is known, premature crosslinking can be prevented by an excess of crosslinking agent, the problem of the equilibration and thus the lack of usefulness of the mixture has been only unsatisfactorily solved up to now. By the hydrolysis of the crosslinking agent in the presence of moisture from the air or from the fillers, alcohol is always present in the mixtures. An undesirable equilibration during the storage of the mixtures is caused by the alcohol and with the joint action of the crosslinking catalyst. Si-O bonds are split and relinked and compounds that contain monoalkoxy-diorgano end groups are formed. If too many of these end groups, which are no longer crosslinking, are present, very soft vulcanizates with insufficient tensile strengths result, or the mixtures are no longer cured during the application.

For the elimination of these deficiencies, crosslinking catalysts that do not catalyze the equilibration reaction, such as titanium chelates, can be used. Since titanium chelates, however, are always colored, it is difficult to obtain colorless products, particularly with transparent formulations.

When using the usual tin compounds (dibutyltin diacetate, dilaurate, or oxide) as crosslinking catalysts, the addition of a stabilizing compound is necessary. These compounds have to react with water or alcohols, giving harmless cleavage products, and thus counteract the equilibration reaction. The addition of silazanes, in particular hexamethyldisilazane (European Patent No. 104,179), or of silyl-substituted carboxylic acid esters (European Patent Nos. 579,208 and 604,086) are described. The addition of two compound groups exhibits disadvantages. Hexamethyldisilazane splits off ammonia. Thus, the pastes no longer exhibit a neutral reaction. The suitable silyl-substituted carboxylic acid esters are mostly only accessible in moderate yields. Furthermore, to form harmless products, they react only slowly with the compounds to be eliminated.

SUMMARY OF THE INVENTION

The object of the invention therefore was to make available alkoxy-crosslinking RTV1 systems that ensure a good stability of the mixtures, suppress equilibrations, and are cured at a sufficiently high rate and yield tackfree elastomers.

The objective of the invention of storage-stable, alkoxy-crosslinking RTV1 systems is obtained by mixing dialkoxyalkylsiloxy- and/or trialkoxysiloxy-terminated polyorganosiloxanes, crosslinking agents, plasticizers, catalysts, fillers, and optionally other known additives and stabilizers, wherein at least one carbodiimide of the following general formula:

is present as a stabilizer, wherein R denotes alkyl, aryl, or silyl radicals that are substituted, independent of one another, and/or unsubstituted.

DESCRIPTION OF THE PREFERRED EMBODIMENTS

In the carbodiimide of general formula (I), cyclohexyl- or silyl-substituted alkyl radicals of the following general formula:

are preferred as radicals R, wherein x and y assume values of 0 to 3, and $R^1$ and $R^2$ denote the same or different, optionally substituted, alkyl radicals. Particularly preferred are trimethylsilyl and 3-trimethoxysilylpropyl radicals.

The carbodiimides in accordance with the invention can be easily produced from urea derivatives, isocyanates, or isothiocyanates according to known methods. They react rapidly with water or alcohols, wherein the same catalysts, which are later used in the rubber mixture for the crosslinking, likewise catalyze this reaction and can be used.

Suitable, commercially obtainable carbodiimides are, for example, dicyclohexylcarbodiimide and bis(trimethylsilyl) carbodiimide.

Up to now, carbodiimides were used as antihydrolysis agents, thermostabilizers, and antiaging agents in polyurethanes. Moreover, they are used as condensation agents in peptide syntheses. In European Patent No. 500,010, dicyclohexylcarbodiimide is described as a drying agent for polyethylene grafted with alkoxysilanes, so as to prevent a preliminary crosslinking because of the presence of water.

The carbodiimides are preferably added to the mixture in quantities of 0.01 wt % to 10 wt %, based on the total mixture.

Alkoxy-crosslinking RTV1-silicone rubber mixtures contain the following as the usual components:

(i) 30 to 90 wt % of at least one alkoxy-terminated polydiorganosiloxane of the following general formula, which can be crosslinked by condensation:

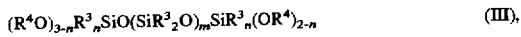

$$(R^4O)_{3-n}R^3_nSiO(SiR^3_2O)_mSiR^3_n(OR^4)_{2-n} \quad \text{(III)},$$

wherein $R^3$ stands for alkyl, alkenyl, and/or aryl radicals, independent of one another, and $R^4$ stands for alkyl radicals; n is either 0 or 1, and m assumes values of 20 to 2000;

(k) 0.5 to 5 wt % of at least one crosslinking silicon-organic compound of the following general formula:

$$R^5_kSiOR^4_{4-k} \quad \text{(IV)},$$

wherein $R^5$ denotes a substituted or unsubstituted, saturated or unsaturated, monovalent hydrocarbon radical with 1 to 6 carbon atoms, and $R^4$ stands for alkyl radicals; and k is either 0 or 1, and/or its condensation products;

(l) 0.01 to 3 wt % of at least one compound catalyzing the hydrolysis and condensation of components (i) and (k);

(m) 0.01 wt % to 10 wt %, preferably 0.1 to 2 wt %, of a carbodiimide;

(n) 1 to 50 wt % of at least one treated and/or nontreated filler, and optionally (o) other known additives.

The alkoxy-terminated polyorganosiloxanes (i) are, for example, obtained by the reaction of at least one hydroxy-terminated polydiorganosiloxane with at least one alkoxysilane, such as methyltrimethoxysilane, in the presence of a catalyst, usually a base or Lewis acid. During the condensation taking place (splitting off of the alcohol), the desired polymer is formed. Usually, $\alpha,\omega$-dihydroxypolydimethylsiloxanes are used for this reaction because of the easy availability on an industrial scale and the very high reactivity.

Examples of the crosslinking silicon-organic compound (k) are methyltrimethoxysilane, vinyltriethoxysilane, tetrakis-(2-methoxyethoxy) silane, tetrapropoxy-, -ethoxy-, or -methoxysilane. Advantageously, the crosslinking agent is added in excess, at least approximately 5 times the stoichiometrically needed quantity.

Usually, organotin or titanium compounds, such as dialkyltin compounds or titanium chelates, are preferred compounds (l) catalyzing the hydrolysis and condensation of components (i) and (k). Dibutyltin dilaurate is particularly preferred.

The fillers (n) are added to the silicone rubber mixture for the attainment of certain mechanical characteristics. Those with a high specific surface, such as fumed silica or precipitated calcium carbonate, are preferred. Moreover, other fillers with a low specific surface can be used as extenders. Ground calcium carbonate is preferred.

Other additives (o) can be the following, among others:

plasticizers, such as trimethylsilyl-terminated polydimethylsiloxanes with viscosities between 0.1 and 1 Pa.s or organic compounds, for example, certain mineral oils;

other stabilizers;

pigments;

fungicides;

adhesives, such as aminopropyltriethoxysilane and/or glycidoxypropyltrimethoxysilane, or silanes with several amino or other alkoxy groups or silanes with other functional radicals; usually, 0.02 to 5 wt % of adhesives is/are used.

On the basis of components (i) to (o), the desired single-component-silicone rubber mixtures can be formulated, wherein the mixture is prepared discontinuously or continuously according to known methods.

It was surprising that the carbodiimides of general formula (I) are excellent as stabilizers for RTV1 systems, and suppress the equilibration over a long period of time. Without the addition of these compounds, the silicone rubber mixture is no longer cured and is thus no longer useful. With the addition of the stabilizer in accordance with the invention, highly qualitative RTV1 systems are obtained, exhibiting an excellent storage stability.

Having generally described this invention, a further understanding can be obtained by reference to certain specific examples which are provided herein for purposes of illustration only and are not intended to be limiting unless otherwise specified.

EXAMPLES

Preparation of the RTV1 Basic Mixture

An RTV1 basic mixture, which was mixed with various catalyst-stabilizer mixtures in the following examples was formulated from 100 parts by weight of an $\alpha,\omega$-bis (dimethoxymethylsiloxy)polydimethylsiloxane with a viscosity of 75 Pa.s, 17 parts by weight of a methyl-terminated polydimethylsiloxane with a viscosity of 0.1 Pa.s, 12 parts by weight of a fumed silica with a BET surface of 150 m²/g, 3 parts by weight of methyltrimethoxysilane, and 0.3 part by weight aminoethylaminopropyltrimethoxysilane. The basic mixture contained approximately 0.4 wt % of methanol (gas chromatographic investigation). The storage stability of the pastes was tested by a storage of the noncrosslinked product at 100° C. for over 24 h. If a product is still cured tackfree after this treatment, a storage stability of a year is ensured at room temperature.

Example 1

100 parts by weight of the RTV1 basic mixture were mixed with 0.23 part by weight of dibutyltin diacetate and also with 2.7 parts by weight of dicyclohexylcarbodiimide. After 24-h storage of this mixture at 100° C., the product is cured to form a tackfree elastomer.

Example 2

100 parts by weight of the RTV1 basic mixture were mixed with 0.23 part by weight of dibutyltin diacetate and also with 1.4 parts by weight of dicyclohexylcarbodiimide. After 24-h storage of this mixture at 100° C., the product is cured to form a tackfree elastomer.

Example 3

100 parts by weight of the RTV1 basic mixture were mixed with 0.23 part by weight of dibutyltin diacetate and also with 0.8 part by weight of bis(trimethylsilyl) carbodiimide. After 24-h storage of this mixture at 100° C., the product is cured to form a tackfree elastomer.

Example 4

100 parts by weight of the RTV1 basic mixture were mixed with 0.23 part by weight of dibutyltin diacetate and also with 2.4 parts by weight of diphenylcarbodiimide. After 24-h storage of this mixture at 100° C., the product is cured to form a tackfree elastomer.

Example 5

100 parts by weight of the RTV1 basic mixture according to Example 1, which, however, contained only 1 part by weight of methyltrimethoxysilane, were mixed with 0.23 part by weight of dibutyltin diacetate and also with 4.6 parts by weight of bis(3-trimethoxysilylpropyl)carbodiimide. After 24-h storage of this mixture at 100° C., the product is cured to form a tackfree elastomer.

Comparative Example V1-without Stabilizer 100 parts by weight of the RTV1 basic mixture were mixed with 0.23 part by weight of dibutyltin diacetate. A stabilizer in accordance with the invention was not added. After 24-h storage at 100° C., curing no longer occurred. The product remained pasty.

Comparative Example V2-without Crosslinking Agent 100 parts by weight of the RTV1 basic mixture, which, however, did not contain a crosslinking agent, were mixed with 0.3 part by weight of dibutyltin dilaurate and 3.5 parts by weight of dicyclohexylcarbodiimide, then poured into cartridges. After a storage of the pastes at 100° C. over 24 h, the product became gelled and it was no longer possible to press it out of the cartridge.

Table I

Table I indicates the mechanical properties of the vulcanizates (specimens according to DIN 53504 S2; prepared after 7 h of curing at 23° C. and 50% relative air humidity) obtained according to Examples 1 to 5 and V1 and V2. The values (A) were determined after approximately 24 h of storage at room temperature; the coefficients (B) were determined after storage over 24 h at 100° C.

TABLE I

| EXAMPLE | STRESS AT 100% ELONGATION | TENSILE STRENGTH | ELONGATION AT BREAK | HARDNESS |
|---|---|---|---|---|
| 1 (A) | 0.35 | 1.30 | 486 | 17 |
| (B) | 0.30 | 1.28 | 512 | 14 |
| 2 (A) | 0.35 | 1.30 | 460 | 17 |
| (B) | 0.28 | 1.23 | 605 | 12 |
| 3 (A) | 0.36 | 1.25 | 460 | 17 |
| (B) | 0.29 | 1.31 | 580 | 13 |
| 4 (A) | 0.36 | 1.28 | 465 | 17 |
| (B) | 0.30 | 1.23 | 525 | 15 |
| 5 (A) | 0.39 | 1.40 | 410 | 19 |
| (B) | 0.32 | 1.20 | 580 | 16 |
| V1 (A) | 0.38 | 1.23 | 450 | 17 |
| (B) | — | — | — | — |
| V2 (A) | 0.38 | 1.45 | 470 | 15 |
| (B) | — | — | — | — |

Due to the pasty consistency, it was not possible to measure the values (B) on the product obtained in accordance with Comparative Example V1 (without a stabilizer).

Due to premature curing, it was not possible to measure the values (B) on the product obtained in accordance with Comparative Example V2 (without a crosslinking agent).

The disclosure of German Patent Application DE 195 15 947, filed May 2, 1995, is hereby incorporated by reference.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A composition comprising at least one dialkoxyalkylsiloxy- and/or trialkoxysiloxy-terminated polydiorganosiloxane, a crosslinking agent therefor in an amount sufficient to crosslink by condensation, a catalyst in catalytic effective amounts, and a stabilizer in stabilizing effective amounts, wherein the stabilizer comprises at least one carbodiimide of the following general formula:

$$R\text{—}N\text{=}C\text{=}N\text{—}R \qquad (I)$$

wherein each R is the same or different and is a silyl-substituted alkyl radical of the following general formula:

$$\text{—}(CH_2)_x SiR^1_y (OR^2)_{3-y}$$

wherein x and y are independently 0 to 3, and $R^1$ and $R^2$ are the same or different alkyl radicals.

2. The composition of claim 1, wherein the carbodiimide is present in an amount of 0.01 wt % to 10 wt %.

3. The composition of claim 1, wherein the at least one dialkoxyalkylsiloxy- and/or trialkoxysiloxy-terminated polydiorganosiloxane has the formula $$(R^4O)_{3-n}R^3_n SiO(SiR^3_2 O)_m SiR^3_n (OR^4)_{2-n} \qquad (III),$$

wherein $R^3$ is independently alkyl, alkenyl, and/or aryl, and $R^4$ is alkyl, n is either 0 or 1, and m is 20 to 2000.

4. The composition of claim 1, wherein the crosslinking agent is a silicon-organic compound of the following general formula:

$$R^5_k SiOR^4_{4-k} \qquad (IV),$$

wherein $R^5$ is a substituted or unsubstituted, saturated or unsaturated, monovalent hydrocarbon radical with 1 to 6 carbon atoms, and $R^4$ stands for alkyl radicals and k is either 0 or 1, and/or a condensation product thereof.

5. The composition of claim 1, wherein the catalyst catalyzes the hydrolysis and condensation of the at least one dialkoxyalkylsiloxy- and/or trialkoxysiloxy-terminated polydiorganosiloxane and the crosslinking agent.

6. The composition of claim 5, wherein the catalyst is an organotin or organotitanium catalyst.

7. The composition of claim 6, wherein the catalyst is a dialkyl tin dicarboxylate or a titanium chelate.

8. The composition of claim 7, wherein the catalyst is dibutyltin dilaurate.

9. The composition of claim 8, wherein the catalyst is dibutyltin diacetate.

10. The composition of claim 1, additionally containing a filler.

11. The composition of claim 1, having the following composition:

(i) 30 to 90 wt % of at least one alkoxy-terminated polydiorganosiloxane of the following general formula, which can be crosslinked by condensation:

$$(R^4O)_{3-n}R^3_n SiO(SiR^3_2 O)_m SiR^3_n (OR^4)_{2-n} \qquad (III),$$

wherein $R^3$ is independently alkyl, alkenyl, and/or aryl, and $R^4$ is alkyl, n is either 0 or 1, and m is 20 to 2000;

(k) 0.5 to 5 wt % of at least one crosslinking silicon-organic compound of the following general formula:

$$R^5{}_k SiOR^4{}_{4-k} \quad \text{(IV)},$$

wherein $R^5$ is a saturated or unsaturated, monovalent hydrocarbon radical with 1 to 6 carbon atoms, and $R^4$ stands for alkyl radicals and k is either 0 or 1, and/or a condensation product thereof;

(l) 0.01 to 3 wt % of at least one compound catalyzing the hydrolysis and condensation of components (i) and (k);

(m) 0.01 wt % to 10 wt % of the carbodiimide;

(n) 1 to 50 wt % of at least one treated and/or nontreated filler, and optionally (o) one or more additives selected from the group consisting of plasticizers, other stabilizers, pigments, fungicides and adhesives.

12. The domposition of claim 11, wherein the carbodiimide is present in an amount 0.1 to 2 wt %.

13. The composition of claim 1, wherein the radical R is trimethylsilyl.

14. The composition of claim 1, wherein the radical R is 3-trimethoxysilylpropyl.

* * * * *

UNITED STATES PATENT AND TRADEMARK OFFICE
CERTIFICATE OF CORRECTION

PATENT NO. : 5,741,839
DATED : April 21, 1998
INVENTOR(S) : Uwe Scheim

It is certified that error appears in the above-identified patent and that said Letters Patent is hereby corrected as shown below:

Column 8, line 6, "domposition" should read --composition--.

Signed and Sealed this

Twenty-seventh Day of October, 1998

Attest:

BRUCE LEHMAN

Attesting Officer    Commissioner of Patents and Trademarks